(12) United States Patent
Evans et al.

(10) Patent No.: US 6,282,187 B1
(45) Date of Patent: *Aug. 28, 2001

(54) NETWORK PROTOCOL FOR WIRELESS BROADBAND ISDN USING ATM

(75) Inventors: Allan Evans, Sunnyvale; Charles VanBlaricom, Cupertino; April Hunter, Los Altos, all of CA (US)

(73) Assignee: Stanford Telecommunications, Inc., Sunnyvale, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/595,138

(22) Filed: Feb. 1, 1996

(51) Int. Cl.[7] ............................. H04B 7/212; H04L 12/28
(52) U.S. Cl. ............................................. 370/347; 370/395
(58) Field of Search ...................... 370/321, 322, 370/324, 314, 329, 336, 337, 347, 349, 395, 396, 397, 398, 399, 507, 508, 346, 348, 449; 371/43–45, 37.1, 37.4, 37.5; 379/59, 60; 455/33.1, 34.1

(56) References Cited

U.S. PATENT DOCUMENTS

| | | | |
|---|---|---|---|
| 5,012,469 | * 4/1991 | Sardana | 370/322 |
| 5,321,725 | * 6/1994 | Paik et al. | 371/37.5 |
| 5,363,373 | * 11/1994 | Nakahara et al. | 370/337 |
| 5,483,537 | * 1/1996 | Dupuy | 370/337 |
| 5,499,243 | * 3/1996 | Hall | 370/346 |
| 5,502,721 | * 3/1996 | Pohjakallio | 370/336 |
| 5,528,583 | * 6/1996 | Acampora et al. | 370/408 |
| 5,553,069 | * 9/1996 | Ueno et al. | 370/395 |

* cited by examiner

Primary Examiner—Chau Nguyen
Assistant Examiner—Chiho Andrew Lee
(74) Attorney, Agent, or Firm—Zim Zegeer (57) ABSTRACT

A networking method for a wireless point base station to a plurality of users where the users are stationary and which utilizes time-division multiplexing in the downstream direction of the base station to the user, including downstream frame timing, comprising providing time-division multiple access in the upstream direction of the user to the base station. Medium access is achieved by actively controlling assigning frame time slots in the upstream direction to accommodate varying demands for bandwidth by multiple users. The upstream frame time slots are synchronized to the downstream frame timing, the time slots carrying individual ATM cells, the first time slot of the downstream frame carries a frame start ATM cell. Upstream time slot synchronization is maintained to within ±2 modulation symbols through timing control from the base station to the user. Random access time slots are used for control plane requests by users entering the network and users in standby mode seeking to begin a session, polling is used for management plane functions and responses by users are on a polling response time slot.

2 Claims, 8 Drawing Sheets

Fig. 1

| OSI Reference Model | | Control Plane | Management Plane |
|---|---|---|---|
| Data Link Layer | ATM Adaptation Layer | | |
| | ATM Layer | | |
| Physical Layer | Transmission Convergence Layer | Medium Access Control | Timing Mgmt |
| | Physical Medium Dependent Layer | | Tx Power Mgmt |

NETWORK PROTOCOL FOR WIRELESS BROADBAND ISDN USING ATM

BACKGROUND OF THE INVENTION

The recent allocation of frequencies by the FCC at 2.5 GHz and 28 GHz has enabled the delivery of broadband-ISDN services to residential and commercial users through wireless means. Broadband ISDN typically uses ATM as the link layer of the network protocol. ATM is a switch-oriented link protocol where each user has a dedicated connection to the switch and the switch manages bandwidth contention by multiple users by queues input cells until they can be delivered to the appropriate output. In a wireless point to multipoint system, the analog of the switch resides in a base station, and the link to the switch is a shared medium by all users whose access to that medium must be controlled. Therefore, for wireless point to multipoint systems there is the additional need for medium access control which is not required in ordinary ATM networks.

The medium access control requirements for wireless point to multipoint systems where the users are stationary are unique compared to other wireless networks such as wireless local area networks (LANs) as specified by the IEEE 802.11 standard. A wireless point to multipoint system can take advantage of the stationary nature of users enabling the use of highly directional antennas at the user stations. However, the base station will still employ broad beam antennas and will thus have multiple user transmissions received simultaneously. Medium access control will be necessary to ensure that mutual interference by multiple user transmission impinging on the base station antenna is eliminated.

There are numerous MAC protocols in currently in use by both wired and wireless standards. In Ethernet, where the cabling is a shared medium, carrier-sense multiple access is employed, which is essentially a listen before talk approach. In wireless LANs, such as that specified by the IEEE 802.11 standard, medium access control is also managed through carrier-sense multiple access. This is possible because portable user terminals will each typically have all omnidirectional antenna so that each user terminal can receive a transmissions from other users and ascertain whether the frequency channel is available. This is not possible with wireless point to multipoint systems where stationary users employ directional antennas, as they cannot receive transmissions from other users.

An additional complication in wide area wireless point to multipoint systems, is that the two way range differential between users close to the base station and those distant to the base station can be much larger than a modulation symbol.

The impetus for the invention is therefore to develop a networking protocol which provides bandwidth to users on an on-demand basis, which controls access by users to the shared wireless medium, which is bandwidth efficient, and which can be implemented with the minimum of hardware cost.

DESCRIPTION

SUMMARY OF THE INVENTION

A networking protocol for wireless point (base station) to multipoint (user) networks where the users are stationary which utilizes time-division multiplexing the in the direction of the base station to the user, heretofore called the downstream direction, and time-division multiple access in the direction of the user to the base station, heretofore called the upstream direction, where medium access control actively assigns time slots in the upstream direction to accommodate varying demands for bandwidth by multiple users, where upstream frame timing is synchronized to the downstream frame timing, where time slots carry individual ATM cells, where the first time slot of the downstream frame carries a frame start ATM cell, where upstream time slot synchronization is maintained to within +2 modulation symbols through timing control from the base station to the user, where random access time slots are used for control plane requests by users entering the network and users in standby mode seeking to begin a session, where polling is used for management plane functions and responses by users are on a polling response time slot.

SPECIFIC FEATURES OF THE INVENTION

A networking protocol for wireless point (based station) to multipoint (user) networks with stationary users utilizing high gain directional antennas where:

1. Means for transmission convergence layer is provided through
   a) Time-division multiplexing is utilized in the direction of the base station to the user, heretofore called the downstream direction;
   b) Time-division multiple access is used in the direction of the user to the base station, heretofore called the upstream direction;
   c) Time slots in the upstream direction have two preamble bytes, one ATM cell, and a one byte guard band;
   d) Time slots in the downstream direction have one sync byte, one ATM cell, and no guard band;
   e) Upstream frame timing is synchronized to the downstream frame timing, where the first time slot of the downstream frame carries a frame start ATM cell which is defined by a unique reserved VPI/VCI;
   f) Frame periods in both the upstream and downstream directions are approximately but not greater than six milliseconds in length to allow delivery of voice traffic with minimum latency.

2. Means for physical medium dependent layer where
   a) The downstream is continuous-carrier, without pulse shape filtering, with frequency channels symbol synchronous and spaced $1/T_D$ apart where $T_D$ is the period of a downstream modulation symbol;
   b) The upstream is burst-mode with 25% excess bandwidth root raised cosine filtered with frequency channels spaced $1.25\ T_U$ apart where $T_U$ is the period of an upstream modulation symbol.
   c) QPSK or alternately 16 QAM modulation is employed on the upstream and the downstream.
   d) A concatenated (60), 54) Reed-Solomon over GF(256) and rate 7/8 convolutional code is used on the downstream; and
   e) A (59, 53) Reed-Solomon code over GF(256) is used on the upstream.

3. Means for control plane functions is provided through
   a) In-band signaling through ATM cells with reserved VIP/VCIs so that the requirements for acquisition, demodulation, and forward error correction are uniform across the data, control, and management planes of the network protocol;
   b) Transmission convergence layer medium access control which dynamically assigns the time slots in the upstream direction to accommodate varying demands for bandwidth by multiple users;

c) Contiguous time slots at the beginning of the upstream frame are used for entry into the network by users whose two-way range timing has not been resolved to avoid mutual interference, where users entering the network remain on the net entry time slots until their timing is aligned by means described in claim 1;

d) Session requests are performed on a contention basis through contention time slots;

e) Carrying control plane acknowledgment of service requests in the payload of the frame start ATM cell in the downstream frame.

4. Means for management plane functions are provided through
   a) In-band signaling through ATM cells with reserved VPI/VCIs so that the requirements for acquisition, demodulation, and forward error correction are uniform across the data, control, and management planes of the network protocol;
   b) Polling users by the base station, with uses responding on dedicated time slots in the upstream frame;
   c) Carrying management plane polling requests in the payload of the frame start ATM cell in the downstream frame carries.
   d) Upstream time slot synchronization is maintained to within ±2 modulation symbols through timing control from the base station to the user and through slaving the user transmit symbol clock to its received symbol clock in the transmission convergence layer.
   e) Upstream power control is employed to ensure adequate received signal strength at the base station while minimizing adjacent cell interference.

5. Hardware and software means for implementing above claims in the base station including:
   a) means for routing of in-band signaling ATM cells by the ATM switching device to and from the central processing unit;
   b) means for measuring timing offsets by subscribers through counting periods of the referenced symbol clock from a master frame epoch to the detection of the Barker sequence of the received transmission from the user;
   c) means for measuring received signal level via bit error rate estimation for closed loop power control of the user transmitter.

6. Hardware and software means for implementing above claims in the user equipment including:
   a) means for routing in-band signaling ATM cells to and from the ATM switching or segmentation and reassembly device to the user equipment central processing unit;
   b) adjusting transmitter power based on received power level and power control commands via in-band signaling ATM cells from the base station;
   c) means for slaving the transmit symbol clock reference to the received symbol clock reference;
   d) means for adjusting the transmit symbol clock timing to minimize interference to other users.

DESCRIPTION OF SPECIFIC EMBODIMENTS

It is well known that asynchronous transfer mode is the candidate network link protocol for broadband integrated services digital network (B-ISDN) which is typically defined as bit rates in excess of that of the primary rate interface ISDN (PRI-ISDN) of 1.544 Mbps. Physical layer standards have been developed or are being developed for using ATM over synchronous optical network (SONET) at rates of 155 and 622 Mbps, over category 3 twisted pair at 25 Mbps, and over category 5 twisted pair at 45 Mbps and 100 Mbps. In each of these cases, however, the network topology is switch-oriented where each user has a dedicated connection to an input port of the switch, and the switch buffers input cells until they can be routed to an output port of the switch. This is a classical star configuration.

In a wireless point to multipoint system, where the users each employ a narrow beam antenna, and the switch resides in a centrally-located base station which employs a broad beam antenna, in which multiple users lie in its beam, the wireless medium becomes a shared medium. While the point to multipoint nature of the systems appears to be a star topology, because the wireless medium is shared, it is actually a bus or ring configuration. Hence, a medium access control protocol needs to be defined.

Figure 1:
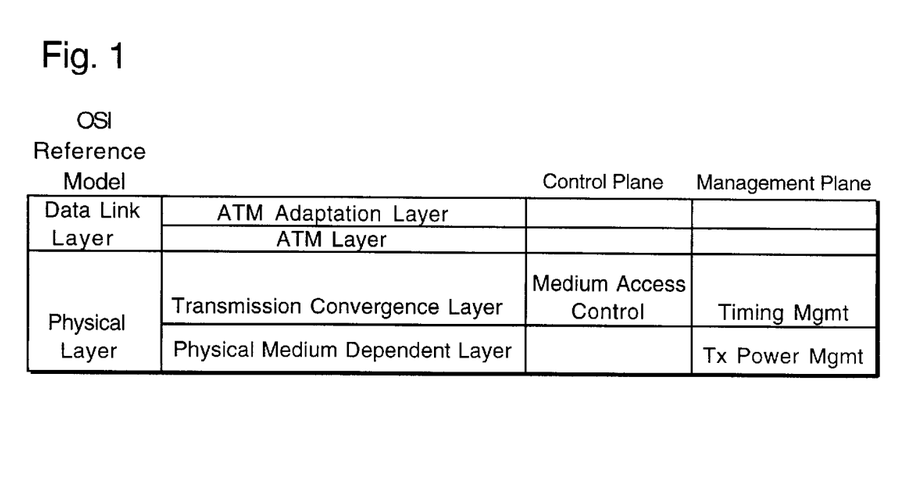
FIG. 1 shows a protocol stack for the invention according to the convention of the OSI Reference Model.

The network protocol stack is as shown in FIG. 1, and comprises the physical layer of the OSI Reference Model. Within the physical layer there is the physical medium dependent layer which involves the modulation, forward error correction, and filtering of the signal that is transmitted over the wireless medium. The transmission convergence layer comprises time-multiple access, the frame structure, and the time slot structure within each frame.

The control plane functions at the transmission convergence layer include those necessary for controlling access to the wireless medium through assignment of time slots. This function must interface to higher level control plane functions such as the ITU Q.2931 signaling standard, the ATM Forum User Network Interface, and LAN Emulation clients.

The management plane functions at the transmission convergence layer involve timing control to minimize guard band times between time slots. At the physical layer, the management functions involve controlling the user transmitter power to ensure an adequate received signal level at the base station but not too strong as to cause adjacent cell interference, where cell refers to a cell in a cellular distribution system, not an ATM cell. Additionally, the management plane functions include controlling the user's transmit frequency so that it does not interfere with users on adjacent frequency channels, which is described in detail in a separate patent application.

Network Protocol Stack

Transmission Convergence Layer

The frame period for both the upstream and the downstream was developed such that the lowest bandwidth constant bit rate user, i.e., a voice band user, is allocated a single time slot per frame. This requires that a frame period is 48 bytes×8 bits/byte÷64 kbps=6 ms. However, with a 6 ms frame, the average time between when the cell is assembled to the time it is transmitted is 3 ms, and the peak time is 6 ms. This means that the two way time delay will be an average of 18 ms, if cells are not double buffered at the source and destination, not accounting for transport delays through the network. If double buffering is employed, this delay would increase to 30 ms, which would require the use of echo cancellers. With 18 ms of average delay and a worst case of 24 ms of delay, any additional delays in routing cells through the network will require echo cancellers. Consequently, the frame period is chosen to be 3 ms which reduces the average turnaround delay to 15 ms with a worst case of 18 ms if a full ATM cell payload of voice is to be sent. In this case, a voice ATM cell would be sent on every other frame. Alternately, two voice channels can be multiplexed into a single ATM cell payload reducing the time to accumulate the payload to 3 ms. This would reduce the two way time delay to an average of 9 ms and a worst case of 12 ms, which clearly obviates the need for voice cancellers. This frame structure is flexible enough to support the evolving voice over ATM proposals, whether two voice channels are multiplexed onto a single ATM cell payload or sent as alternate ATM cells. This frame structure eliminates the need for a more complicated superframe structure and also the need for echo cancellers.

The start of the downstream frame is delineated by a Frame Start ATM cell in the first time slot. This Frame Start ATM cell carries a reserved VPI/VCI header with the Payload type set as an OAM cell. This enables the Frame Start ATM cell to be routed directly by the segmentation and reassembly ASIC to the host processor in the user equipment. This will reset the upstream frame time slot count in the user processor, enabling the upstream frame timing to be synchronized to the downstream frame timing.

TABLE 1

Downstream Frame Structure

| Frame Start | Time Slot 1 | Time Slot 2 | Time Slot 3 | Time Slot 4 | Time Slot 5 | ... | Time Slot N-2 | Time Slot N-1 | Time Slot N |
|---|---|---|---|---|---|---|---|---|---|

TABLE 2

Frame Start Cell Payload

| I ... N | N + 1 ... M | M + 1 ... P | P + 1 ... 48 |
|---|---|---|---|
| Contention Availability/ Acknowledgment | Subscriber Ids for Polling | Subscriber Timing Frequency, and Power Adjustments | Reserved |

The upstream frame structure is shown in Table 3. There will be contiguous time slots at the beginning of the frame for contention by users attempting to switch to an active state from an inactive state, or by users needing control signaling during an active state. The polling response time slots are reserved for users who are polled by the base station to enter the network during a power up, or to respond on a

TABLE 3

Upstream Frame Structure

| Polling Response 1 | Polling Response 1 | ... | Polling Response M | Contention 1 | ... | Contention N | Traffic 1 | ... | Traffic p |
|---|---|---|---|---|---|---|---|---|---|

Physical Medium Dependent Layer

The physical medium dependent layer was constructed to enable the upstream frame period to be identical to the downstream frame period so that they may remain continually synchronized and also to ensure that the downstream symbol rate was an integer multiple of the upstream symbol rate. These values for upstream and downstream symbol rates and time slots per frame is shown in Table 4. The high rate upstream column can be used for subscribers that employ premium equipment that has higher transmit power capability, or have an advantaged line of sight path to the base station.

TABLE 4

Physical Medium Dependent Layer parameters

|  | Units | Low Rate Upstream | High Rate Upstream | Downstream |
|---|---|---|---|---|
| Frame Period | ms | 3.186 | 3.186 | 3.186 |
| Time Slots per Frame |  | 42 | 168 | 392 |
| ATM Cell Rate | cells/s | 13183.594 | 52734.375 | 123046.875 |
| ATM Rate | Mbps | 5.590 | 22.359 | 52.172 |
| Time Slot Efficiency |  | 15/16 | 15/16 | 53/54 |
| Bit Rate | Mbps | 5.9625 | 23.850 | 53.1563 |

TABLE 4-continued

Physical Medium Dependent Layer parameters

| | Units | Low Rate Upstream | High Rate Upstream | Downstream |
|---|---|---|---|---|
| Reed Solomon Efficiency | | 53/75 | 53/75 | 9/10 |
| Convolutional Code Efficiency | | 1 | 1 | 7/8 |
| Coded Symbol Rate | Mbps | 8.4376 | 33.7500 | 67.5000 |
| QPSK Modulation | | 2 | 2 | 2 |
| Channel Symbol Rate | Mbaud | 4.2188 | 16.8750 | 33.7600 |
| Excess Bandwidth | Hz/Baud | 1.3000 | 1.3000 | 1.2000 |
| Channel Bandwidth | MHz | 5.4844 | 21.9375 | 40.5000 |
| Available Bandwidth | MHz | 125.0000 | 125.0000 | 825.0000 |
| Number of Channels | | 22.79 | 5.70 | 20.37 |

Downstream

Figure 2:
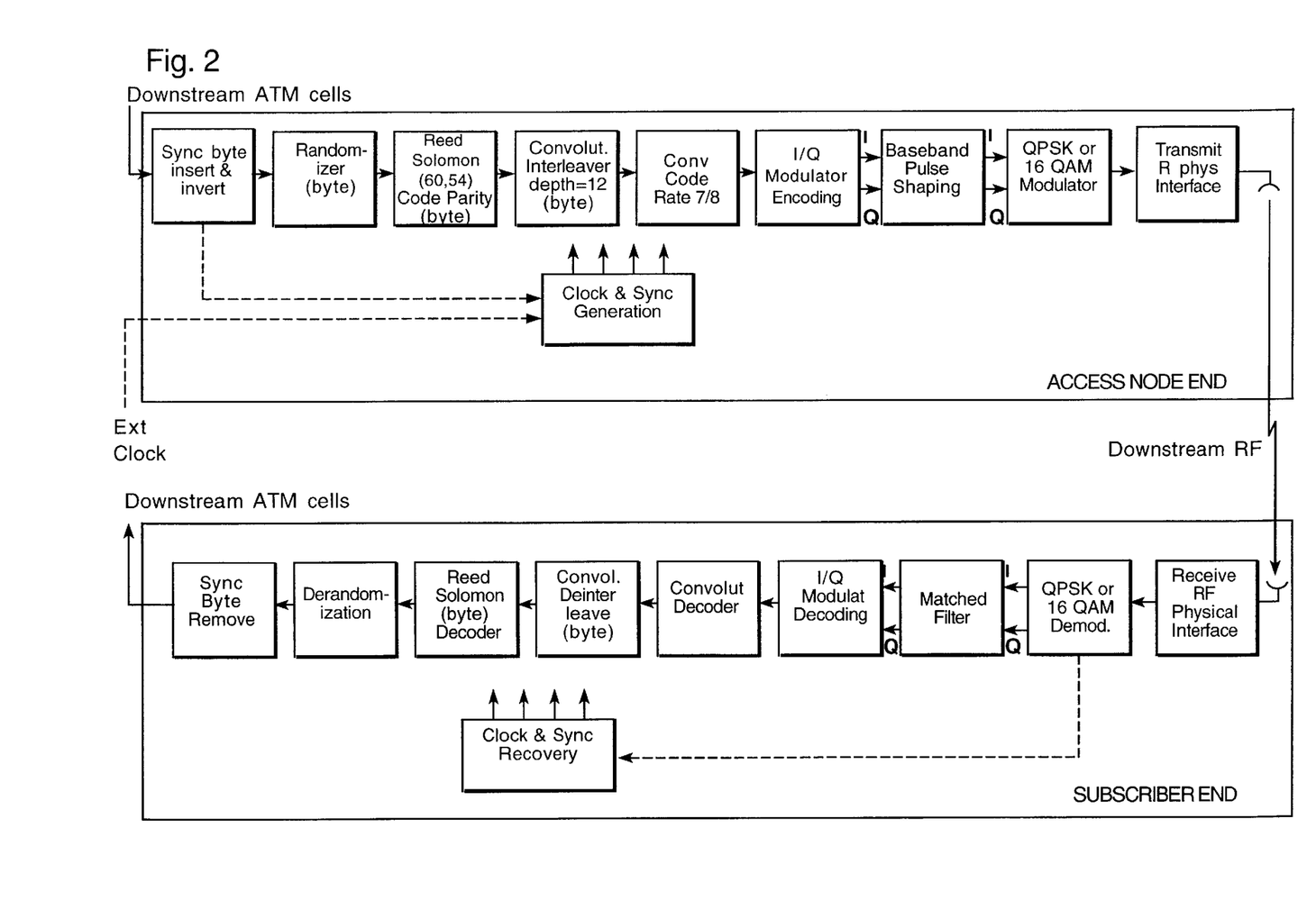
FIG. 2 illustrates the modulation and demodulation of the downstream carrier with encoded data.

To carry downstream information in a channel from the Access Node end to the Subscriber end, a continuous carrier waveform shall be modulated with QPSK or 16QAM symbols. The modulation and demodulation of the downstream carrier with encoded data is illustrated in FIG. 2.

A one-byte sync preamble shall be appended to each downstream ATM cell from the Transmission Convergence Layer, and the sync preamble shall be inverted every N=7 cells. The resultant data stream, shall be randomized for spectral shaping except for the sync bytes, and the randomizer shall be reinitialized at occurrence of each inverted sync byte in the data stream. Each ATM cell and its sync preamble shall be encoded by a Reed-Solomon FS (60,54) forward error correction block code over GFR(256).

The stream of Reed-Solomon encoded data packets shall be interleaved on a byte basis by a convolutional interleave using the Forney method with interleave depth of 15, and then convolutionally encoded by the specified rate 7/8 convolutional code. The convolutional interleaver commutator shall be phased relative to the sync bytes so that the sequence of sync bytes is delayed at the interleaver output but the periodicity of sync bytes is unaltered by the interleaver.

The convolutionally coded data shall be mapped into inphase (I)/quadrature (Q) baseband pulses corresponding to either QPSK or 16QAM modulation signal constellations. The baseband pulses shall be shaped by root-raised cosine filters with an excess bandwidth factor of $\alpha=0.22$ and then modulated onto the downstream RF carrier.

The preceding sequence of operations at the access node for downstream data transmission shall be reversed at the subscriber end for reception of downstream data. The demodulated I and Q data shall be filtered by root-raised cosine filters with an excess bandwidth factor of a=0.22 and then remapped from the I/Q signal constellations into a binary data stream. The binary stream shall be convolutionally decoded and then deinterleaved on a byte basis.

The deinterleaved bytes shall be Reed-Solomon decoded, de-randoinized, and sync preambles removed to yield the downstream ATM cells at the subscriber end. The decoded sync bytes at the output of the convolutional decoder serves as epochs for (1) convolutional deinterleaver commutator initialization, (2) Reed Solomon code boundaries and (3) for initialization of the de-randomizer. The modulation parameters are shown in Table 5.

TABLE 5

Downstream Modulation Parameters

| Parameter | Value |
|---|---|
| Pulse-Shape Filtering | $\alpha = 0.22$ Root Raised Cosine |
| Modulation | QPSK or 16 QAM |
| Convolutional Encoding | Rate 7/8 |
| Interleaving | Forney Method, Depth = 12 |
| Reed-Solomon Encoding | (60, 54) over GF(256) |

Since the downstream data originates from the same source and is continuous carrier, different ATM virtual circuits are time-division multiplexed onto a single RF carrier. The format is shown in Table 7.

TABLE 5

Downstream Modulation Parameters

| 1 | 2 | 3 | ... | 54 | 55 | 56 | 57 | 58 | 59 | 60 |
|---|---|---|---|---|---|---|---|---|---|---|
| Sync Byte | ATM Cell | | | | Check Byte 1 | Check Byte 2 | Check Byte 3 | Check Byte 4 | Check Byte 5 | Check Byte 6 |

Upstream

Figure 3:
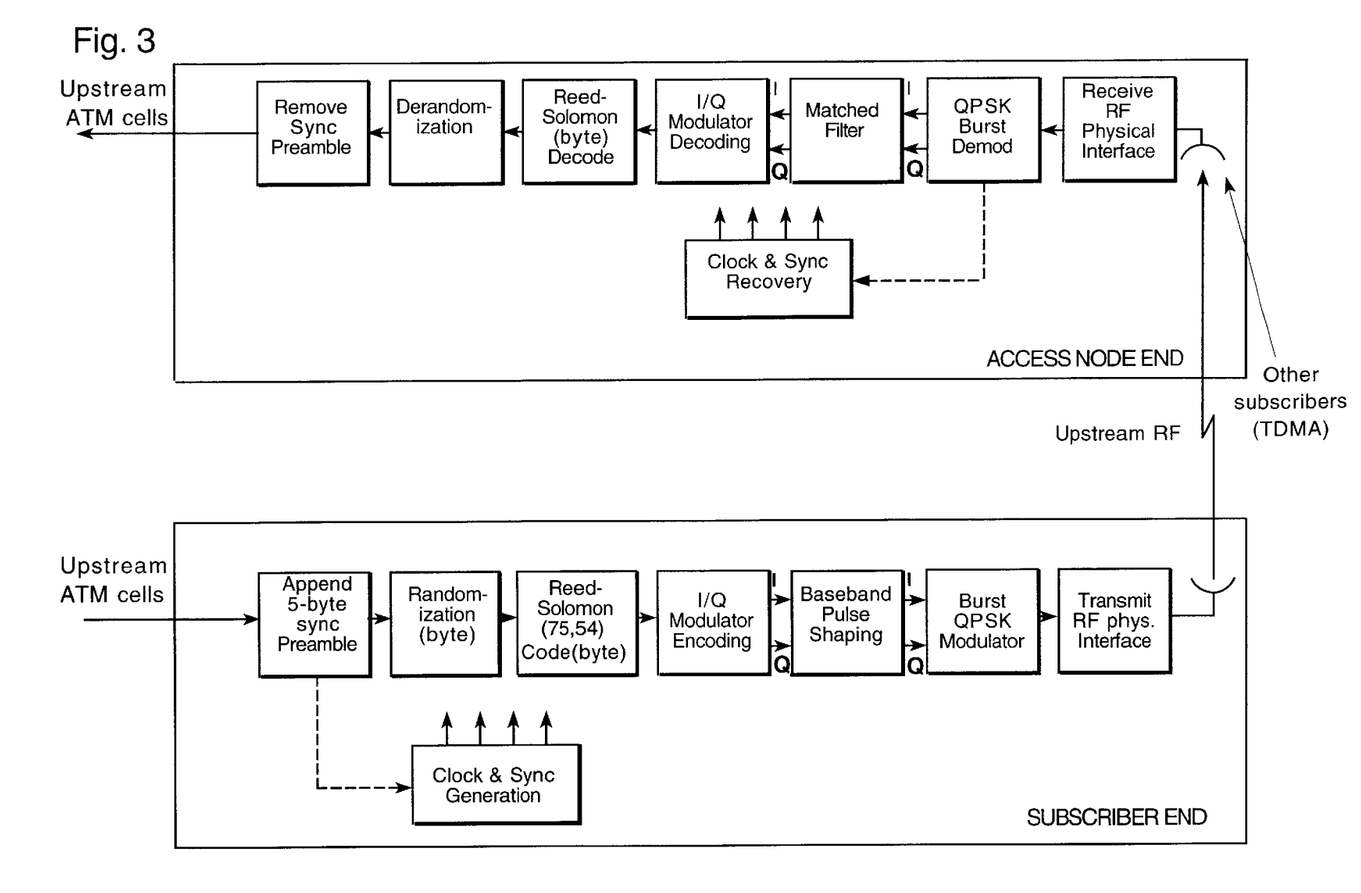
FIG. 3 illustrates the modulation and demodulation of the upstream carrier with packet data.

Upstream data in a frequency channel shall be carried in burst TDMA packet transmissions from the subscriber transmitter. The modulation and demodulation of the upstream carrier with packet data is illustrated in FIG. 3.

The ATM cell shall be randomized for spectral shaping with a radomizer, and the randomized ATM cell, not including the preamble, shall be encoded for forward error correction by a Reed-Solomon RS (75,53) code over GF(256).

The preamble and Reed-Solomon coded ATM cell shall be mapped into I/Q baseband pulses corresponding to QPSK modulation signal constellation. Each preamble bit shall be mapped into a QPSK symbol so that effectively BPSK is employed during the preamble. The baseband modulation pulses shall be filtered with root-raised cosine filters having an excess bandwidth factor of $\alpha=0.30$ and the packet data is burst modulated onto the upstream RF waveform.

The preceding operations at the subscriber node for upstream transmission shall be reversed at the access node end for reception of upstream burst transmissions. The burst demodulator shall accomplish symbol synchronization on the preamble, followed by data demodulation. The demodulated I and Q data shall be filtered by a root-raised cosine matched filter with an excess bandwidth factor $\alpha=0.30$, and then remapped into bytes for Reed-Solomon decoding. After Reed-Solomon decoding, the data stream is de-randomized and the sync preamble removed to yield the upstream ATM cell. The modulation parameters are shown in Table 8.

TABLE 7

Upstream Modulation Parameters

| Parameter | Value |
|---|---|
| Pulse-Shape Filtering | α = 0.30 Root Raised Cosine |
| Modulation | DQPSK |
| Convolutional Encoding | None |
| Interleaving | None |
| Reed-Solomon Encoding | (75, 53) over GF(256) |

Since the upstream data originates from different sources, each with different symbol timing and center frequency offsets, the upstream will be time-division multiple access. A 4-byte sync preamble containing a 15-bit Neuman Hoffman (001111100110101) code shall be appended to each upstream ATM cell from the Transmission Convergence Layer at the subscriber end. The Barker sequence is BPSK modulated during the preamble. The four preamble bytes represent 16 modulations symbols, the first 15 of which are used to BPSK modulate the Barker sequence. The last modulation symbol of the preamble is used as a phase reference for differential demodulation. The format for the time slot is shown in Table 10.

Figure 4:
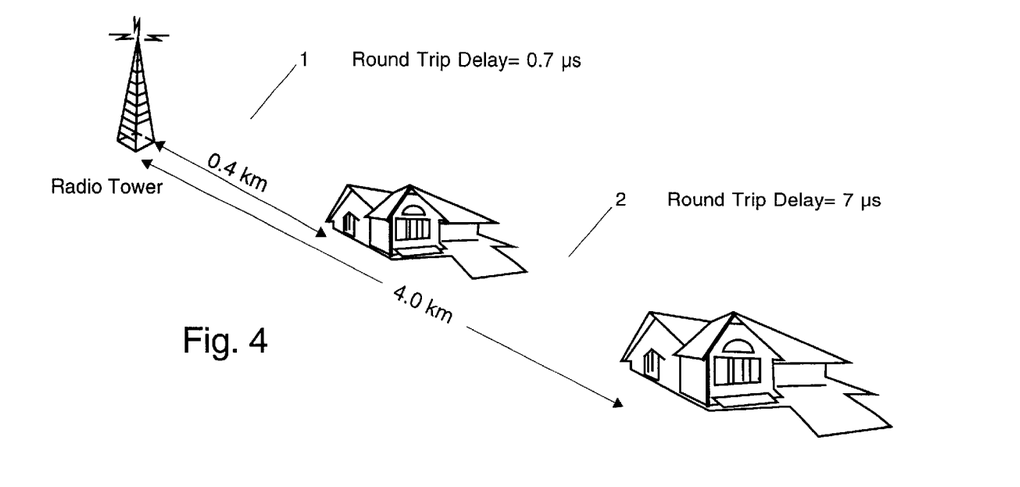
FIG. 4 illustrates the two way turnaround effect of range from the base station which causes the need for large guard bands between user transmission.

Because a base station will have to service both nearby and distant users, active time slot synchronization will be necessary to maintain guardbands between user transmissions to a minimum as shown in FIG. 4. Traveling at the speed of light, it will take nearly 7 $\mu$s for a transmission to complete a round trip from the base station to the furthest user and back, as compared with only 0.7 $\mu$s for a user only one tenth the distance away. With a 5 Mbps upstream data rate, this amounts to 30 bit periods or nearly 4 bytes. Without active time slot synchronization, the guard band between users bursts would have to be maintained at 4 bytes which is nearly 10% of the total time slot. This overhead is worse for higher data rates and larger cell sizes. Consequently, by maintaining time slot synchronization by sending timing corrections from the base station to the user, to within ±½ byte the overhead is limited to 1 byte or less than 2%.

TABLE 8

Upstream Time Slot Structure

| 1 2 3 4 5 6 ... 57 | 58 | 59 | ... | 79 | 80 |
|---|---|---|---|---|---|
| Preamble | ATM Cell | Check Byte 1 | Check Byte 2 | Check Byte 22 | Guard Byte |

Management Plane
Net Entry

Upon power up, the user will acquire the downstream frame timing and recover the begin processing the Contention Availability/Acknowledgment field of the Frame Start cell payload. When the contention time slots are available, a null user ID will be contained in the field. The user will then transmit a single Net Entry ATM cell on the Contention time slot in the next upstream frame. A Net Entry ATM cell will be defined by a reserved VPI/VCI in the cell header, plus additional information in the payload containing the user ID. If the Net Entry ATM cell is successfully received by the base station, the base station will acknowledge by responding with the user's ID in the Contention Availability/Acknowledge field of the frame start cell in the next frame. The field will also contain timing, frequency, and power adjustments.

The user will continue to transmit Net Entry ATM cells on the Contention time slots until its timing, frequency, and power are within prescribed limits at which time it will be commanded to a standby state freeing up the Contention time slots for another user.

In the case of a collision on the Contention time slots, the base station will not acknowledge any user and the Frame Start cell will continue to indicate that the Contention time slots are available by containing the null user ID. The users will then perform any number of well known algorithms, such as randomly back off based on the user ID, to determine how many frames they wait before retransmission.

Network Management

During operation, inactive users will have to be periodically polled to ensure that their time slot timing, transmit frequency, and transmit power are suitable to maintain reliable communication. This is necessary as the propagation characteristics will change over time; for instance if it begins to rain. With approximately 250 users per coverage area, polling one user per frame, each user would be polled every 1.5 seconds. The number of users poller per frame will depend on user density, coverage area, and data rates employed when the system is deployed.

The polling sequence is described. In the Frame Start cell, user IDs are placed in the Polling field. During the next frame, those polled subscribers respond on the Polling Response time slots. The base station computes the correction factors for timing, frequency, and power control and sends them in the Subscriber Adjustment field of the Frame Start cell in the next frame.

If a user fails to respond to a poll, the Subscriber Adjustment field will be null for that user. The base station will then wait until the next cycle, after it polls all other users, before polling the user again, so that other users are polled at the regular interval. After a certain number of polls where the user fails to respond, the network manager will consider that user in a power down state. That user will have to perform Net Entry to return to the standby state.

MAC Protocols and Scenarios

| frame_start( ) – OAM Cell [FS] | Bits | Bit Number/ Bytes Description |
|---|---|---|
| ( | | |
| poll_request [FS.P] | | ~<20 Status Request |
| poll_feedbaek [FS.P] | | ~<10 Upstream Tx Calibration/ Serial Number |

-continued

| msg() | Bits | Bytes | Bit Number/Description |
|---|---|---|---|
| message_field [FS.M] ) | ~14 | | |
| ( | | | |
| niu_id | 16 | 2 | |
| msg_type | 8 | 1 | Identifies the message type |
| Num_msg_items | 8 | 1 | # of messages being sent |
| msg_items | | | Variable Length |
| ) | | | |

The niu_id is a unique identifier of a specific NIU in the polling list of NIU's for a group of downstream and corresponding group of upstream frequency channels on which the NIU may receive and transmit, respectively. An niu_id=$FFFF is used to indicate all NIU's, i.e., it is the "multi-cast" ID. The VC header maydirect this message to only one NIU or may broadcast the message.

The msg_type is one of the messages in the msg_type table. The num_msg_items is the number of items of the designated message type that are in the given instantiation of the message. The msg_items is the list of items of the type designated by the msg_type.

| msg_type | Slot Type | Delivery | Description |
|---|---|---|---|
| idle_msg | [VC] | AIU<-NIU/STB | Reserved time slot filler. |
| tx_calibration | [FS, VC] | AIU<-NIU/STB | NIU transmit freq, power, time corrections. |
| reserved_slot_request | [C] | AIU->NIU/STB | NIU request for reserved time slots. |
| reserved_slot_allocation | [FS, VC] | AIU->NIU/STB | Allocation/deallocation of reserved time slots. |
| contention_slot_allocation | [FS, VC] | AIU->NIU/STB | Allocation/deallocation of contention time slots, |
| poll_slot_allocation | [FS, VC] | AIU->NIU/STB | Allocation/deallocation of polled time slots. |
| service_request | [C] | AIU<-NIU/STB | |
| service_connection | | AIU->NIU/STB | |
| service_release | | AIU<>NIU/STB | |
| service_msg_ack | [FS, VC, C] | AIU<>NIU/STB | |
| serial_no | [VC] | AIU<>NIU/STB | NIU partial or full serial number. |
| configuration | | AIU->NIU/STB | Several NIU configuration items. |
| configuration_ack | | AIU<-NIU/STB | Acknowledgement of receipt of configration items. |
| status_request | | AIU->NIU/STB | |
| status_response | | AIU<-NIU/STB | |
| attention_request | | AIU<-NIU/STB | |
| attention_response | | AIU->NIU/STB | |

The control and management messages sent across A1 between the AIU CPU and the NIU/STB CPU must be single cell OAM messages. Note that the OAM cell has a 45-byte available payload. The poll [P] and contention [C] time slots sent from the NIU only contain control messages, and thus, are only OAM cells. Reserved time slots sent from the NIU carry AAL5, AAL1, for voice data, ATM cells and OAM control message cells. Since only the reserved time slots are used to transmit user data over an AAL5 or AAL1 virtual connection, the reserved time slots are referenced as [VC]. The NIU shall transmit on every reserved time slot. If no data is available, an idle message shall be transmitted. The AIU may deallocate reserved time slots for an NIU that is not utilizing the reserved time slots for data. The idle cells may be used to determine upstream transmit signal calibration corrections, upstream BERR, reserved time slot utilization, and NIU acknowledgment of reserved time slot allocation/deallocation.

All message fields are unsigned unless otherwise stated. The type of each field is sufficiently defined by the following message tables.

| Idle_msg() [VC] | Bits | Bytes | Bit Number/ Description |
|---|---|---|---|
| { | | | |
| IDLE_PATTERN | 360 | 45 | |
| } | | | |

Upstream Time Slot Allocation

Figure 7:
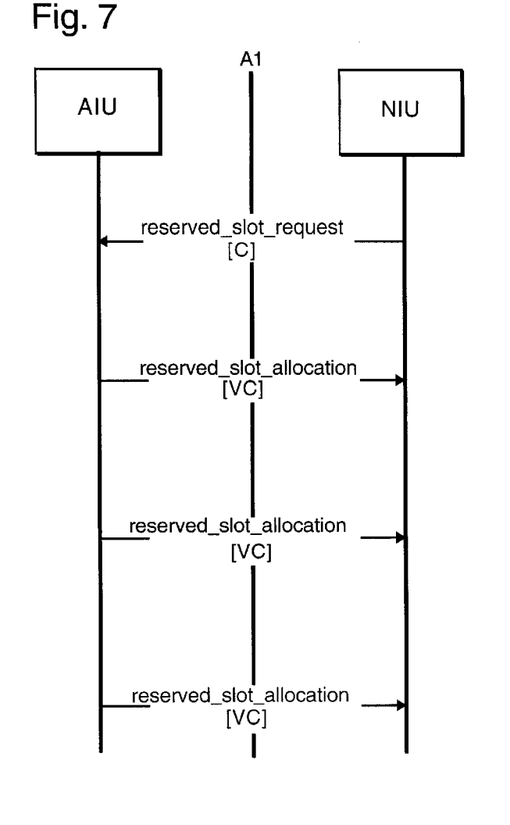
FIG. 7 illustrates the upstream time slot allocation.

As shown on FIG. 7, the MAC upstream time slot allocation scenario depicts how reserved, contention, and polled time slots for transmitting upstream from the NIU are allocated and deallocated. The only difference in the scenario for each of the different type of time slots is that reserved time slots may be requested by the NIU. The contention and polled time slots are never requested by the NIU. The AIU decides which upstream frequency channels and time slots of those channels should be allocated to each NIU as a contention or polled time slot. The reserved time slot allocation differs from the contention and polled time slot allocation in that the NIU may request reserved time slots. However, the reserved times slots, like the contention and polled time slots, may be allocated by the AIU without a request from the NIU. The time slot allocation messages may be sent as an update of a previously sent message rather than a change of allocation. This is shown in the scenario. The three types of time slot allocation messages are also similar in structure. Each is designated by a different message type but the fields are identical.

| | Bits | Bytes | Bit Number/ Description |
|---|---|---|---|
| reserved_slot_request( )[C] | | | |
| { | | | |
| num_time_slots | 8 | 1 | |
| min_VBR-packet-size | 16 | 2 | number of 48 byte cell payloads |
| } | | | |
| reserved_slot_allocation( )[VC] | | | |
| { | | | |
| time_slot_allocation | | | |
| } | | | |
| contention_slot_allocation( )[VC] | | | |
| { | | | |
| time_slot_allocation | | | |
| } | | | |
| poll_slot_allocation ( ) [VC] | | | |
| { | | | |
| time_slot_allocation | | | |
| } | | | |

-continued

| | Bits | Bytes | Bit Number/ Description |
|---|---|---|---|
| time_slot_allocation ( ) [VC] | | | |
| { | | | |
|   upstream-channel_num | 4 | 1 | |
|   time_slot_page | 4 | | |
|   is_change | 1 | 1 | MSB, 0=update, 1=change |
|   num_time_slots | 7 | | 7 LSB |
|   time_slot_list | 8per | 1per | pos=allocate, neg=deallocate |
| } | | | | reserved_slot_request

When the NIU determines that it needs more reserved time slots for user traffic, it requests more slots. The AIU decides how many reserved time slots to allocate to the NIU. If the NIU still needs more reserved time slots, it will send another reserved slot request to the AIU. The NIU may send in this message the number of time slots that it believes that it needs or always set the num_time_slots field to 1. The min_VBR_packet_size is the number of cells that are buffered at the NIU awaiting upstream transmission. Note that a cell in this case is considered to be 48-bytes.

reserved_slot_allocation

The reserved_slot_allocation message changes or updates the allocation of upstream reserved time slots for an NIU. The reserved time slots are the only time slots that may be used for user traffic. The NIU shall transmit an idle message cell on every reserved time slot for which the NIU does not have any data ready to transmit. After the NIU is initially calibrated and is allocated reserved time slots, the calibration correction parameters for the signal transmitted upstream from the NIU may be determined from the receipt of the reserved time slots.

contention_slot_allocation

The contentions_slot_allocation message changes or updates the allocation of upstream contention time slots for an NIU. Contention time slots may not be used for user traffic. If upstream traffic is mostly bursty data traffic, then contention time slot demand for time slot requests may be high. The AIU does not need to inform the NIU's that a contention slot is busy. If multiple handshakes are required in order to complete a task, the AIU may do so in a controlled manner. A VC could be used or, if the handshake rate is slow, the NIU could be polled to tell it when to respond.

poll_slot_allocation

The poll_slot_allocation message changes or updates the allocation of upstream polling response time slots for an NIU. Guard time slots are not allocated in the poll time slot allocation.

time_slot_allocation

The time_slot_allocation message may be used to change or to update the allocation of any type of upstream time slots for an NIU. Each time slot is referenced by frequency channel and time slot page such that a single time slot is a single element in a 2-dimensional array. The upstream_channel_num designates the upstream frequency channel number where O indicates the lowest channel based on frequency and 15 indicates the highest channel based on frequency. The time_slot_page designates the group of 128 times slot where O indicates times slots O through 127 and 1 indicates time slots 128 through 255. The is_change bit indicates whether this message is allocating or deallocating time slots on the stated page of the frequency channel or is only an update which lists the time slots that are currently allocated for the NIU. Num_time_slots is the number of time slots from O to 127 that are in the following list for the channel and page. The time_slot_list is a list of numbers that correspond to each time slot on the page. The first time slot is referred to a 0, and the last time slot on the page is referred to as 127. If the time slot number is positive, i.e., the MSB is cleared, then the time slot is allocated. If the time slot number is negative, i.e., the MSG is set, then the time slot is deallocated.

Polling Handshake

Figure 8:
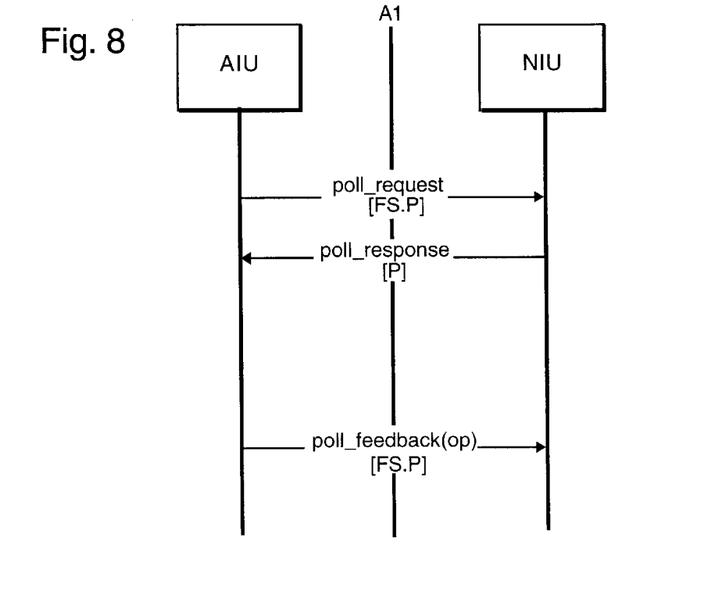
FIG. 8 illustrates the polling handshake.
Figure 9:
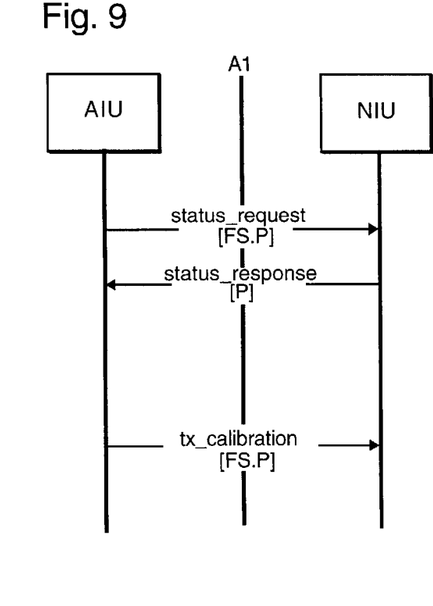
FIG. 9 illustrates an example of upstream signal calibration, FIG. 10 diagrammatically illustrates the net entry, FIG. 11 diagrammatically illustrates the server connecting, and FIG. 12 diagrammatically illustrates the sector load balance.

FIG. 8 diagrammatically illustrates the following handshake and FIG. 9 diagrammatically illustrates an example of upstream signal calibration.

The NIU shall be polled periodically to establish commnunication and maintain communication with the NIU. If no other messages are flowing from the AIU to the NIU, the polling handshake shall occur on an interval of less than or equal to 2 seconds. This is for proper upstream transmit signal calibration and to facilitate network entry both before the NIU has determined which downstream frequency is polling it and while waiting for configuration. The polling handshake is initiated by the AIU with a poll_request in the frame start cell. The NIU responds on the upstream polling time slot that the AIU has allocated to the NIU. If the most recent poll request from the AIU does not include a poll_slots_allocation message in the frame start time slot poll_request field, the NIU shall assume that the time slots allocated for the polling response is the same as indicated in the previous poll_slots_allocation message that it received from the AIU. If more than one time slot in a frame period is allocated for polling, the NIU shall respond on the earliest time slot in the frame. If the NIU is not aligned in time, the NIU's response may be received at the AIU during the time slots following the desired polling response time slot. Guard time slots must not be allocated by the AIU as reserved, contention or poll time slot for any NIU if the current NIU being polled is not time aligned. Only 1 polling time slot may need to be allocated otherwise. The guard time slots must follow the poll time slot. Also, the NIU must attempt to respond on the first time slot in order to do timing calculations. Polling of the NIU's that have not been calibrated, i.e. are entering the net, should be done consecutively so that the head-end can allocate the guard time slots for contention usage for the longest amount of time. The polling handshake may include a third message referred as poll_feedback. Some of the types of messages included as poll_request are poll_slot allocation, status request, and serial_no. The poll_response may be a status_response message. Tx_calibration is a type of message that may be included as poll_feedback. The NIU and AIU shall implement a poll response and poll feedback delay of two frames.

| | Bits | Bytes | Bit Number/ Description |
|---|---|---|---|
| serial_no( )[FS.P] | | | |
| { | | | |
|   serial_no_byte | 8 | 1 | MS-byte first |
| status_request( ) [FS.P] | | | |
| { | | | |
|   niu_tx_power | | | dBm |
|   niu_rx_power | | | dBm |
|   current_state (of X module) | | | |
|   is_ok (X module) | | | |
|   etc. | | | |
| } | | | |
| status_response( ) [FS.P] | | | |

-continued

| | Bits | Bytes | Bit Number/ Description |
|---|---|---|---|
| { | | | |
| niu_tx_power | | | dBm |
| niu_rx_power | | | dBm |
| current_state (of X module) | | | |
| is_ok (X module) | | | |
| etc. | | | |
| } | | | |
| tx_calibration ( ) [FS,P] | | | |
| { | | | |
| freq_correction | 8 | 1 | 10 KHz |
| time_correction | 16 | 2 | 2 downstream symbols |
| power_correction | 8 | 1 | .2dB |
| } | | | | serial_no

The num_msgs field indicates the number of serial_no_byte, or least-significant bytes of the serial number, are in this message. The maximum number of bytes is 20.

status_request

This is a list of the status items requested from the NIU. Most of the status is acquired via a VC for management.

status_response

This is a list of the status items that were requested by AIU.

tx_calibration

The corrections for the upstream transmit signal from the NIU are sent in this message. The frequency correction is a signed integer with a resolution of 10 KHz where a positive value indicates that the NIU should increase its frequency, and a negative value indicates that the NIU should decrease its transmit frequency. The time correction is a signed integer with a resolution of 2 downstream symbols which equals 1 downstream sample clock period. The power correction is a signed integer with a resolution of 2 tenths of a dB where a positive value indicates that the NIU should raise its power, and a negative value indicates that the NIU should lower it transmit power. Poll requests do not need to be sent in order to determine the NIU's transmit signal corrections. This would be possible if the head-end is capable of determining timing, etc. adjustments from traffic time slots. Using a VC for the calibration message sent to the NIU wastes bandwidth since the information is small and infrequent enough such that it may be sent in the frame start time slot.

Net Entry

Figure 10:
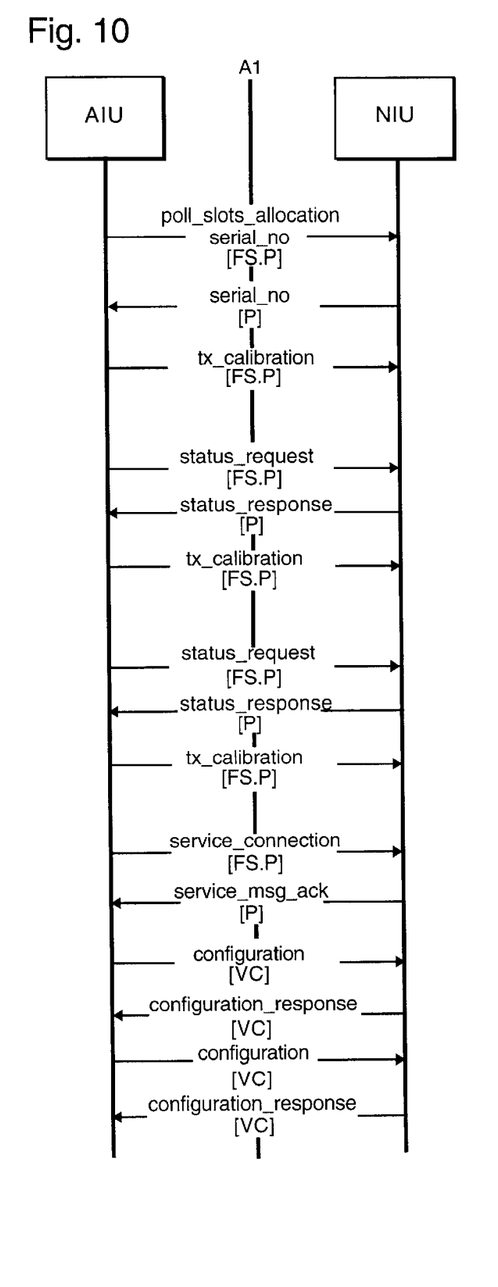

As shown in FIG. 10, the AIU polls each of the NIU's on at least one of the downstream frequency channels in a group. Before the NIU enters the network, it may be polled on more than one downstream frequency channel from different channel groups, and a different niu_id may be used for each group. When the NIU attempts to enter the network, it acquires a downstream frequency channel and listens for the poll directed to it. Since the NIU has not entered the network, in order for the NIU to recognize that the poll is directed to it, the AIU sends the NIU's partial or full serial number along with the niu_id in the polling request message. Polls are not necessarily round robin so can't wait till same niu_id comes around. Each NIU's transmit signal must be corrected on a regular basis, but a poll request message is not necessary in order to send a transmit calibration message to the NIU. If the NIU waits S seconds, but does not receive its serial number, it will acquire the next downstream frequency and again listen for its serial number. This process repeats until the NIU finds a downstream frequency channel on which it is being polled. Once the NIU finds its poll and, then, responds to the poll, the NIU is only polled by this one downstream frequency channel.

So that the poll response time slot sent by the NIU does not interfere with adjacent upstream time slots during the initial polling handshakes, at least one guard time slot must follow the NIU poll response time slot until the NIU transmit signal is sufficiently time aligned. Once the NIU is calibrated, a connection for MAC control service is assigned and the security and configuration handshakes are executed. Once the NIU is configured, it goes into "Standby". "Standby" is characterized by lack of user activity. The AIU continues to poll the NIU while it is in "Standby" to maintain upstream transmit signal calibration.

The minimum and maximum time before retransmission, i.e. back-off time, for the NIU transmitting a control message on the contention time slots are configuration items that may be sent to the NIU during net entry or any time after that based on system usage.

Configuration

| | Bits | Bytes | Bit Number/ Description |
|---|---|---|---|
| configuration ( ) [VC] | | | |
| { | | | |
| configuration_item_id | 16 | 2 | |
| configuration_value | | 1-n | Depends on the item being configured |
| } | | | |
| configuration_ack ( ) [VC] | | | |
| { | | | |
| configuration_message_received | 1 | 1 | Bit 0: 1 = Message Received<br>0 = Message needs to be resent |
| configuration_accepted | 1 | 1 | Bit 1: 1 = Message accepted<br>0 = Message conflicts with other configuration parameters |
| } | | | | configuration

The configuration message is used by the AIU to send configuration parameters to the NIU/STB. The configuration message is sent asynchronously to either an individual NIU, via the VC, or broadcast to all NIU's, via a broadcast VC. The AIU will assign a downstream broadcast VC during the AIU system startup.

Whenever an NIU starts to enter the network, the AIU will assign a VC to the NIU for status and configuration messages. The niu_id is a 16 bit value assigned to the NIU before net entry and subscriber authentication. The special value of −1 (0xFFFF) will be used to indicate all NIU's. The configuration message uses the standard message format with the niu_id, msg_type, and num_msg_items as the common part. The remainder of the message is structured to selectively set configuration items as needed. The num_msg_items which is the "num_configuration_items" indicates the number of items being set in this message, where each item is identified by its configuration_item_id. Each configuration item in turn requires a different number of bits or bytes for the value. Therefore, "configuration_value" can be from 1 to n (TBD) bytes.

configuration_ack

Every configuration message received by the NIU will have an acknowledgment sent back to the AIU. This message is sent upstream during one of the allocated reserved time slots. The acknowledgment will include both a message received and a configuration accepted response.

Figure 11:
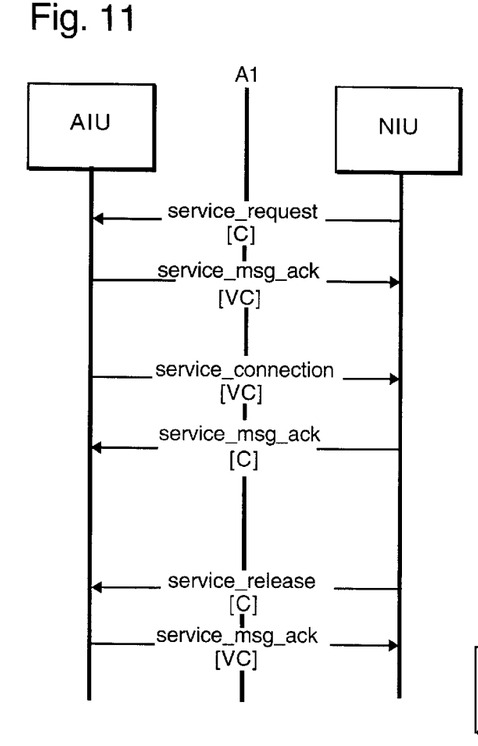

Configuration Items
1. Some contention cell assignment. (Current complete or partial list).
2. Security "key" or Security Item.
3. From NIU: Max # overhead cells/sec that it can handle.
4. MAC Protocol Version—MIB
5. Minimum and maximum transmit power level
6. Upstream data bit rate
7. Contention retry:
   Min time between contention retry or time slot request
   Max time for random contention retry
   Retry algorithm type
8. Which upstream frame to respond to a poll. The start of the next upstream frame after the poll request is frame number 1.
9. Upstream frame offset from start of downstream frame.
10. Service message retry timeout: (If don't get back with/in some time) and number of retries
11. TBD Service Connections FIG. 11 diagrammatically illustrates the service connections and the following tables show bit, byte and description of each:

|  | Bits | Bytes | Bit Number/Description |
|---|---|---|---|
| service_request( ) [C] |  |  |  |
| { |  |  |  |
| niu_service_id | 16 | 2 |  |
| service_type | 8 | 1 | management |
|  |  |  | control |
|  |  |  | user data |
|  |  |  | user video |
|  |  |  | user voice |
| } |  |  |  |
| service_connection( ) [VC] |  |  |  |
| { |  |  |  |
| niu_service_id | 16 | 2 | 0 = MAC sercvice |
| VPI | 8 | 1 |  |
| VCI | 16 | 2 |  |
| } |  |  |  |
| service_release( ) [VC or C] |  |  |  |
| { |  |  |  |
| niu_service_id | 16 | 2 | 0 = MAC sercvice |
| } |  |  |  |
| service_msg_ack ( ) [VC or C] |  |  |  |
| { |  |  |  |
| niu_service_id | 16 | 2 |  |
| } |  |  |  | service_request

A service_request message is to set-up a connection to a server or entity that can provide the control flow for that type of service. If a signaling connection for a type of service, e.g. data service, has been connected, then following signaling messages and connection data do not require a service_request message and handshake. The niu_service_id is a unique number for that service for the one NIU designated by the niu_id in the message header. The service_type indicates to the AIU to which server or entity the service control connection should be made.

service_connection

The service_connection specifies the VC, i.e. VPI/VCI, that the NIU must use for the requested service connection. A different control connection for signaling may be assigned for each port of the STU for support of simultaneous signaling control flows from the same STU.

service_release

The service control connection is disconnected after it is no longer needed by the STU or can no longer be supported by the AIU. Service_release originates from either the AIU or the NIU/STB.

service_msg_ack

To ensure that service is provided within a reasonable or necessary time, as determined by the type of service, the service_msg_ack is sent in response to each of the service messages. The acknowledgment shall be sent in less than or equal to 25 msec.

Sector Load Balance

Figure 12:
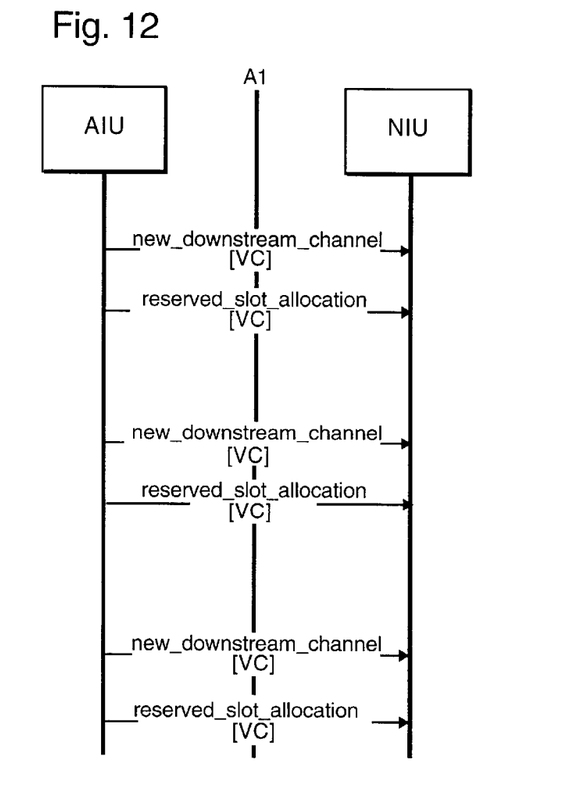

FIG. 12 diagrammatically illustrates the sector load balance and the following table shows the bit/byte allocations:

| new_downstream_channel ( ) | Bits | Bytes | Bit Number/Description |
|---|---|---|---|
| { |  |  |  |
| downstream_channel_num | 8 | 1 |  |
| } |  |  |  |

Hardware and Software Implementations

User Equipment

Figure 5:
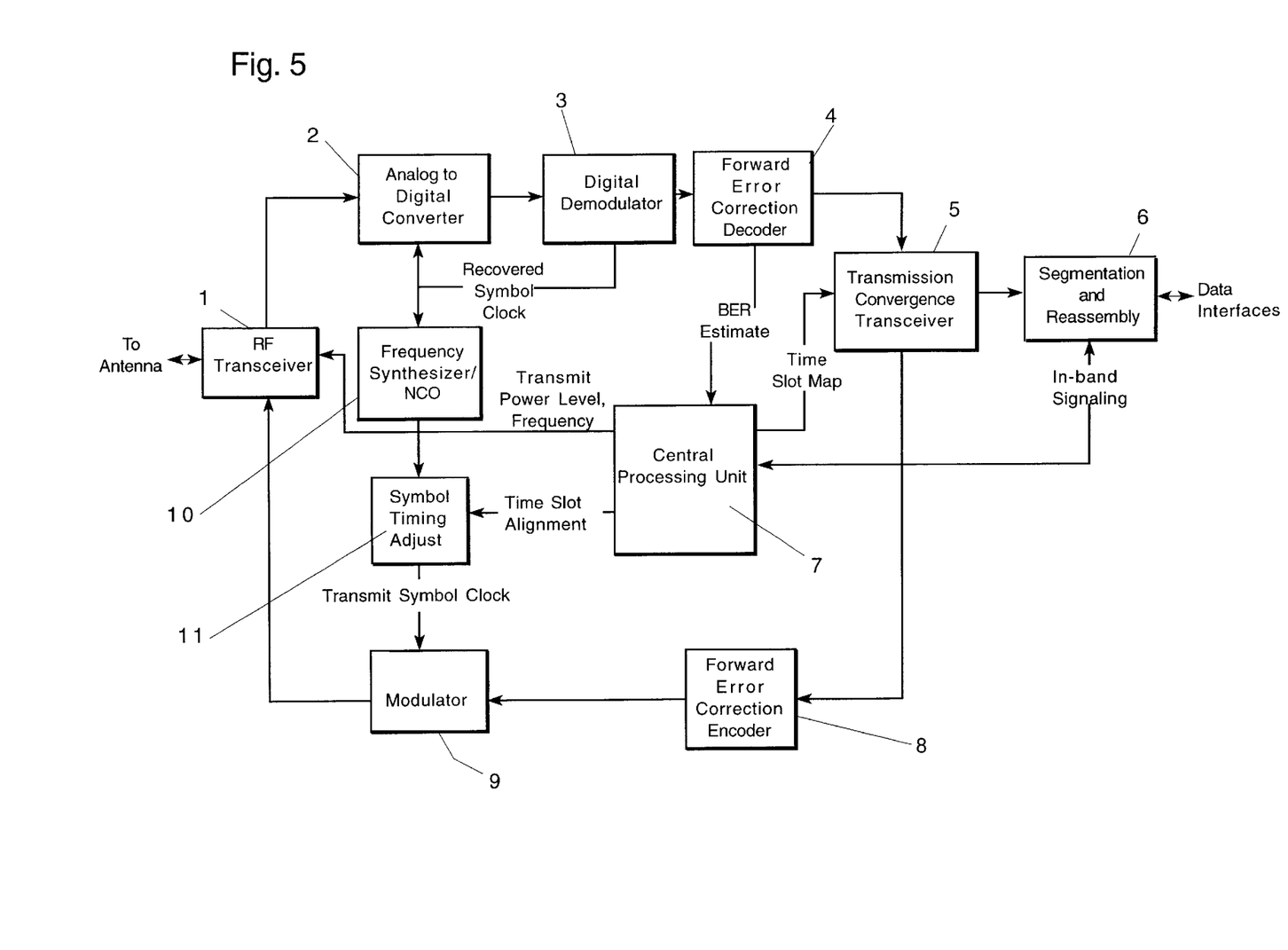
FIG. 5 is a block diagram of the hardware for user equipment.

FIG. 5 shows the block diagram for the subscriber equipment which implements the wireless network protocol. An RF transceiver (1) interfaces with the antenna and performs signal amplification, downconversion from RF to baseband, and the gain control to provide proper levels into the analog to digital (A/D) converter (2). The digital demodulator (3) recovers the carrier and symbol timing of input signal and passes soft-decision demodulated data to the forward error correction decoder (4). The digital demodulator recovers the input signal symbol timing by controlling the phase of the A/D converter sample clock via a data transition tracking loop fed back to a voltage-controlled oscillator (not shown for clarity). The digital demodulator also controls the gain in the downconverter stage of the RF transceiver via a gain control voltage. The forward error correction decoder performs convolutional decoding via the Viterbi algorithm and Reed-Solomon decoding and passes recovered ATM cells to the transmission convergence transceiver (5). The transmission convergence transceiver detects the frame start ATM cell and counts time slots within the frame to filter out ATM cells which are not intended for the user. ATM cells intended for the user are passed to the segmentation and reassembly (SAR) device (6) which constructs higher level packets to be passed to the data interfaces. In band ATM signaling cells are passed directly to the central processing unit (7) which interprets the commands.

In the transmit direction, the central processing unit maintains a time slot map which is loaded into the transmission convergence transceiver. As higher level packets from the data interfaces are segmented into ATM cells, the transmission convergence transceiver loads them into the prescribed time slots of the upstream frame. In-band signaling cells, either session requests or responses to polling are passed from the central processing unit to the segmentation and reassembly device for insertion into the upstream frame.

Alternately, the transmission convergence transceiver can recognize and direct in-band signaling ATM cells to and from the central processing unit and bypass the SAR device. This would enable a physical layer only interface between the user equipment and other user premises equipment, since the SAR would not be performing segmentation and reassembly. Ultimately, the transmission convergence transceiver and the SAR may be combined into a single device.

ATM cells packaged onto the upstream frame are passed to the forward error correction encoder (8) which then sends the serial stream to the modulator (9) for modulation onto a carrier. The symbol timing of the modulator is coherently referenced to the recovered receive symbol timing via a frequency synthesizer or numerically controlled oscillator (NCO) (10). The symbol timing can be adjusted to ensure time slat alignment by a clock swallower circuit (11) or other means. The modulated signal is then frequency converted to the desired RF frequency by the RF transceiver. The output power level is controlled by the CPU from measurements of received power level from the AGC feedback from the digital demodulator to the RF transceiver and from the bit error rate estimator in the forward error correction device.

Base Station Equipment

Figure 6:
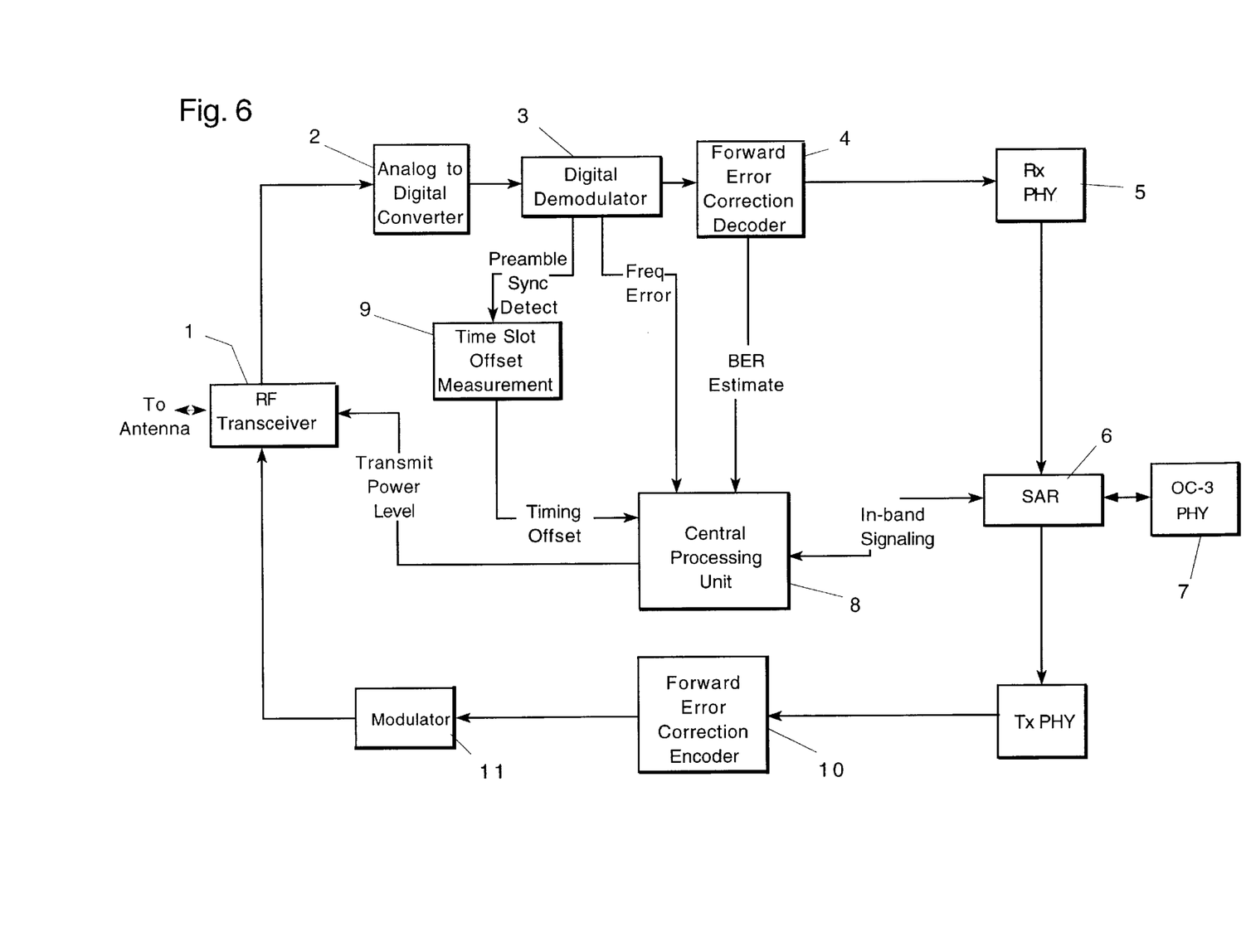
FIG. 6 is a block diagram of the hardware architecture for the base station equipment.

FIG. 6 shows the block diagram for the base station equipment. An RF transceiver (1) interfaces with the antenna and performs signal amplification, downconversion from RF to baseband, and the gain control to provide proper levels into the analog to digital (A/D) converter (2). The digital demodulator (3) recovers the carrier and symbol timing of input signal and passes soft-decision demodulated data to the forward error correction decoder (4). The forward error correction decoder performs convolutional decoding via the Viterbi algorithm and Reed-Solomon decoding and passes recovered ATM cells to the ATM switch (5). The ATM switch may be implemented as a segmentation and reassembly ASIC, or as an external piece of equipment. In-band ATM signaling cells are passed directly to the central processing unit (6) which interprets the requests and polling responses.

When the base station polls a user for status and health, it will read the user's timing offset from the timing offset counter (7), and the user's frequency offset and signal level from the digital demodulator. Corrections to these are assembled into an in-band ATM cell and passed to the ATM switch for insertion into the downstream frame. Time slots in the downstream frames are filled with cells by the ATM switch according to typical scheduling functions of switches with the exception that the ATM switch inserts the frame start cell received from the central processing unit and exact intervals. The ATM cells are then forward error correction encoded (8) and modulated (9) to form the downstream RF. The RF transceiver upconverts the downstream signals to radio frequency. The central processing unit adjusts the transmit power level according to bit error rate measurements fed back from the subscriber to the hub station in the upstream network management polling response ATM cells.

Variations

The following variations should be obvious to the trained observer and are also claimed:
1. Use of alternate data rates resulting in a different number of time slots per frame.
2. Use of means other than ATM switch for routing in-band signaling ATM cells to the CPU in the base station.
3. Use of means other than SAR device for routing in-band signaling ATM cells to the CPU in the user equipment.
4. Location of the contention cells and polling response cells within the upstream frame. Depending on processing capability, it may be advantageous to place the polling response time slot in the middle of the upstream frame, so that the subscriber can respond within the same frame period.
5. Use of alternate circuits for adjusting the user transmit time slot timing with respect to implementing a network protocol for wireless broadband-ISDN. Use of alternate circuits for unrelated applications is not claimed.
6. Other measures of received power level by the user equipment such as monitoring AGC settings, bit error rates prior to forward error correction decoding, etc.

What is claimed is:

1. A networking method for wireless point base station to plurality of users where said users are stationary and which utilizes time-division multiplexing in the downstream direction of the base station to the user, including downstream frame timing, comprising:

providing time-division multiple access in the upstream direction of the user to the base station, controlling medium access by actively assigning frame time slots in said upstream direction to accommodate varying demands for bandwidth by multiple users, said upstream frame time slots are synchronized to said downstream frame timing, said time slots carry individual ATM cells, the first time slot of the downstream frame carries a frame start ATM cell, maintaining said upstream time slot synchronization to within ±2 modulation symbols through timing control from the base station to the user, causing random access time slots to be used for control plane requests by users entering the network and users in standby mode seeking to begin a session, and causing polling to be used for management plane functions and responses by users are on a polling response time slot.

2. In a networking method for wireless point base station to multiple users in which the users are stationary, comprising establishing time division multiple access in the downstream direction of the base station to the user station including downstream frames and in the upstream direction from the user station to the base station, controlling said access by all said user stations by actively assigning frame time slots in the upstream direction to accommodate varying demands for bandwidth by multiple users, carrying individual asynchronous transfer (ATM) mode cell time slots in said frame time slots and wherein the first time slot of a downstream frame carries a frame start ATM cell, maintaining upstream direction time slot synchronization to within plus or minus two modulation symbols in the direction of from the base station to the user, using random access time slots for control plane requests by users entering the network and users in standby mode seeking to begin a session, and wherein polling is used for management plane functions and responses by users is in a polling response time slot.

* * * * *

UNITED STATES PATENT AND TRADEMARK OFFICE
CERTIFICATE OF CORRECTION

PATENT NO.    : 6,282,187 B1
DATED         : August 28, 2001
INVENTOR(S)   : Allan Evans et al.

It is certified that error appears in the above-identified patent and that said Letters Patent is hereby corrected as shown below:

Column 2,
Line 9, correct the arithmetic symbol to read -- ±2 --.

Signed and Sealed this

Fifteenth Day of April, 2003

JAMES E. ROGAN
*Director of the United States Patent and Trademark Office*